April 13, 1965    M. T. DAVIDSON ETAL    3,177,744
LATHE STOCK CATCHER
Filed May 24, 1963
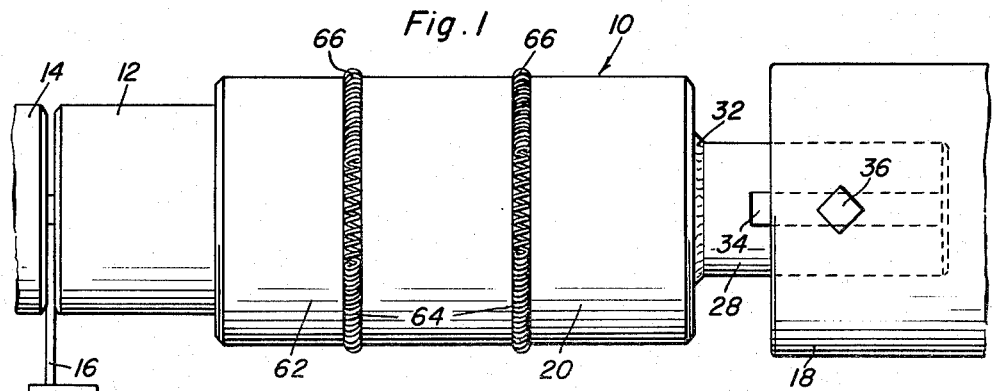
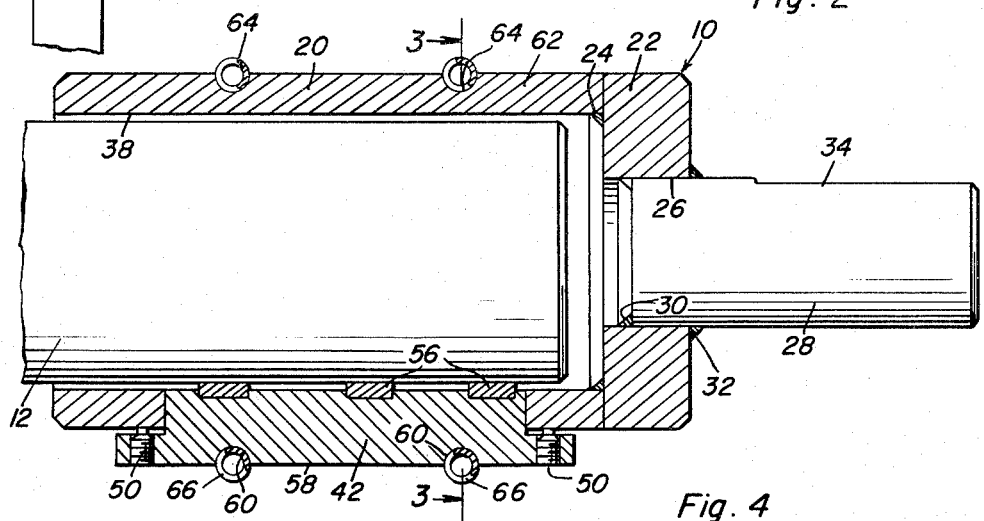
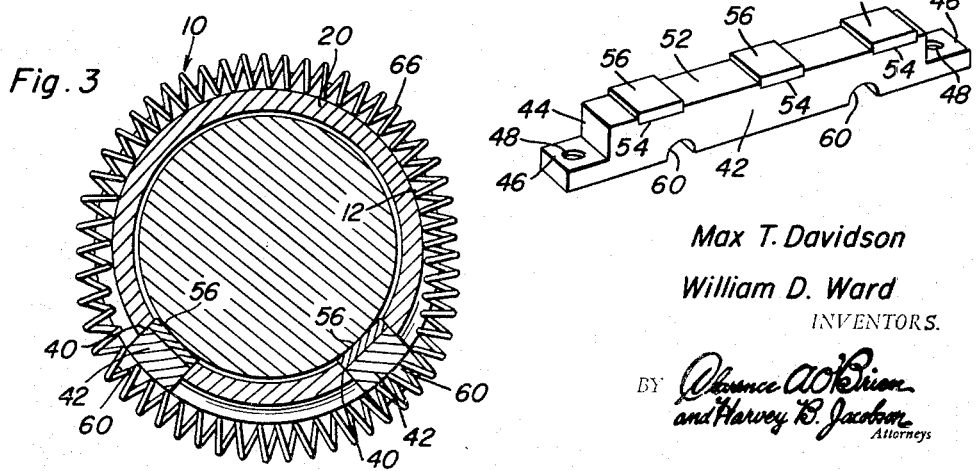
Max T. Davidson
William D. Ward
INVENTORS.

United States Patent Office 3,177,744
Patented Apr. 13, 1965

3,177,744
LATHE STOCK CATCHER
Max T. Davidson and William D. Ward, Decatur, Ill., assignors to B & H Associated Designers, Decatur, Ill., a partnership
Filed May 24, 1963, Ser. No. 283,044
6 Claims. (Cl. 82—38)

This invention relates to a novel and useful lathe stock catcher and more specifically to a device designed primarily to perform the function of catching the stock during cut-off operations.

When bar stock and the like is supported from the head stock of a lathe and a cut-off tool is supported from a tool holder and being utilized for cutting a portion of the bar stock from the free end thereof, as the final cut is made with the cutter blade the extremely small portion of the bar stock connecting the cut-off portion with the remainder of the bar stock may be readily bent and thus it is possible to laterally deflect the free end of the portion of the bar stock which is being cut from the remainder thereof. Laterally deflecting this portion of the bar stock can cause serious injury to the operator of the lathe, breakage of the cutter blade and irreparable damage to be caused to that end of the stock to which the cut-off portion is secured.

It is accordingly the main object of this invention to provide a lathe stock catcher which will be capable of loosely telescopingly receiving that portion of the bar stock which is to be cut from the remainder thereof and frictionally engaging and supporting the cut portion of the bar stock and preventing its lateral deflection during the final cutting operation severing the cut portion of the stock from the remainder of the latter.

A further object of this invention is to provide an apparatus in accordance with the preceding object that will be adapted to frictionally but lightly grip the portion of bar stock supported from a lathe which is to be cut from the remainder of the bar stock.

Still another object of this invention is to provide a lathe stock catcher including means by which it may be readily adapted to handle bar stock of various diameters.

Still another object of this invention is to provide a lathe stock catcher constructed in a manner adapting it to be readily fixedly supported from a tail stock tool holder or the like.

A final object of this invention to be specifically enumerated herein is to provide a lathe stock catcher in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the lathe stock catcher of the instant invention shown being supported from the tail stock tool holder of a lathe;

FIGURE 2 is an enlarged vertical longitudinal sectional view taken substantially upon a plane passing through the longitudinal center line of the catcher;

FIGURE 3 is a transverse vertical sectional view taken substantially upon the plane indicated by section line 3—3 of FIGURE 2; and FIGURE 4 is a perspective view of one of the inserts of the catcher which are utilized to frictionally but loosely grip the bar stock which is being cut.

With the attention now directed more specifically to the drawings the numeral 10 generally designates the lathe stock catcher of the instant invention which is shown operatively associated with a section 12 of bar stock which is being cut from the remainder 14 of the bar stock by means of a cutter blade 16. The bar stock comprising the sections 12 and 14 is being supported and rotated by the head stock (not shown) of a lathe while the cutter blade 16 is being supported from a tool holder carried by the lathe. In addition, the stock catcher 10 is being supported from a tool holder 18 carried by the tail stock (not shown) of the lathe.

The lathe stock catcher 10 comprises a length of seamless tubing 20 defining a sleeve and an apertured plug 22 is secured to the rear end of the tubing section 20 in any convenient manner such as by welding 24. The plug 22 has a bore 26 formed therethrough in which a shank portion 28 is fixedly secured in any convenient manner such as by welding 30 and 32. The rear end of the shank portion 28 is provided with a land 34 against which the setscrew 36 carried by the tool holder 18 seats when securing the shank portion 28 within the tool holder 18.

The longitudinal axis of the bore 26 is aligned with the longitudinal axis of the bore 38 defined by the tubular section 20 and the tubing section 20 has a pair of elongated longitudinally extending generally radial slots 40 formed therein and each slot has an insert 42 slidably disposed therein for movement generally radially of the tubing section 20.

As can best be seen from FIGURES 2 and 4 of the drawings, each of the inserts 42 includes a foreshortened portion 44 defining a pair of abutment flanges 46 on opposite ends of the insert adapted for engagement with the external surfaces of the tubing section 20 beyond the opposite ends of the corresponding slot 40 to limit inward penetration of that insert. The abutment flange portions 46 are provided with threaded bores 48 in which setscrews 50 are threadedly engaged. The setscrews 50 comprise adjustable abutments for engagement with the external surfaces of the tubing section 20 whereby inward penetration of each end of each insert 42 may be limited.

The inner surface 52 of each insert 42 has a plurality of transversely extending grooves 54 formed therein in which a plurality of abutment members 56 are secured in any convenient manner. The outer surface 58 of each insert 42 has a plurality of transversely extending semi-circular grooves 60 formed therein and the outer surface 62 on the tubular section 20 is provided with a pair of circumferentially extending semi-circular grooves 64.

The grooves 60 are registered with the grooves 64 and a pair of expansion springs 66 are provided and seated in corresponding ones of the grooves 60 and 64 and yieldingly urge the inserts 42 radially inwardly of the tubular section 20 toward a position with the innermost ends of the setscrews 50 engaged with the outer surface 62 of the tubular section 20.

Inasmuch as the springs 66 engage opposite end portions of each of the inserts 42 and the opposite end portions of the inserts 42 are provided with the adjustable abutment setscrews 50, it may be seen that the lathe stock catcher may even be adjusted to snugly and frictionally grip slightly tapered pieces of bar stock.

Inasmuch as the section 14 of bar stock must be rotated about a fixed axis of rotation and the lathe stock catcher 10 is to be fixedly supported from the tool holder 18, the longitudinal axis of the bore 38 is aligned with the longitudinal axis of the bore 26 in order that the section 12 of the bar stock may be positioned on the longitudinal axis of the bore 38. This will position the upper periphery of the section 12 in slightly spaced relation relative to the upper portions of the bore 38 and enable the inserts 42 to frictionally engage the bar stock 12.

It is to be noted that the inserts 42 may be readily replaced by inserts of different types in order to adapt the tool stock catcher 10 to catch various types of bar stock.

In operation, as the cutter blade 16 makes the final cutting action on the material disposed between the sections 12 and 14 of the bar stock, proper support on the section 12 is provided by means of the lathe stock catcher 10 and is thereby prevented from being appreciably laterally deflected relative to the section 14 of the bar stock which could result in damage of the section 14 or the cutter blade 16 and injury to the operator of the lathe. Further, it will be noted that the semi-circular groove 60 are arcuate in longitudinal cross-nection and therefore that the spring 66 will act upon the insert 42 throughout a greater extent of its length.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. A lathe stock catcher adapted to be fixedly supported from a tail stock tool holder or the like and utilized to loosely telescopingly receive and frictionally and rotatably support the portion of the bar stock which is to be removed by using a cutoff blade, said catcher comprising bore defining sleeve means including support means at one end adapted for support from a tail stock tool holder or the like with said sleeve substantially axially aligned with the axis of rotation of the bar stock, said sleeve means having at least two longitudinally extending and circumferentially spaced slots formed therein and disposed on one side of a diametric plane extending longitudinally of said sleeve means, said sleeve means on the other side of said plane being free of inwardly projecting portions, a pair of elongated inserts mounted in said slots for movement generally radially of said sleeve means, and means normally yieldingly urging said inserts inwardly of said sleeve means toward positions with portions of said inserts projecting into said bore whereby said inserts may frictionally and slidably grip said portion of said bar stock and urge said portion into frictional engagement with the remote surfaces of said bore for holding said portion as it is cut from the remainder of said bar stock, said inserts including abutment means engageable with said sleeve means limiting their inward radial movement relative to said sleeve means.

2. The combination of claim 1 wherein said abutment means are adjustable whereby the limit of inward movement of said inserts may be adjusted.

3. A lathe stock catcher adapted to be fixedly supported from a tail stock tool holder or the like and utilized to loosely telescopingly receive and frictionally and rotatably support the portion of the bar stock which is to be removed by using a cutoff blade, said catcher comprising bore defining sleeve means including support means at one end adapted for support from a tail stock tool holder or the like with said sleeve substantially axially aligned with the axis of rotation of the bar stock, said sleeve means having at least two longitudinally extending and circumferentially spaced slots formed therein and disposed on one side of a diametric plane extending longitudinally of said sleeve means, said sleeve means on the other side of said plane being free of inwardly projecting portions, a pair of elongated inserts mounted in said slots for movement generally radially of said sleeve means, and means normally yieldingly urging said inserts inwardly of said sleeve means toward positions with portions of said inserts projecting into said bore whereby said inserts may frictionally and slidably grip said portion of said bar stock and urge said portion into frictional engagement with the remote surfaces of said bore for holding said portion as it is cut from the remainder of said bar stock, said inserts including abutment means engageable with said sleeve means limiting their inward radial movement relative to said sleeve means, each of said elongated inserts including a pair of said abutment means disposed on opposite end portions thereof.

4. The combination of claim 1 wherein said sleeve means includes a pair of circumferential spring seat means extending about the outer surfaces of said sleeve means between the opposite ends of said slots, said urging means comprising annular compressive spring means engaged with said seat means to prevent shifting of said spring means axially of said sleeve means and engaged with and yieldingly urging the remote end portions of each of said inserts radially inwardly of said sleeve means.

5. The combination of claim 1 wherein said elongated inserts include rubbing block portions disposed on the inner surfaces thereof and spaced longitudinally of the latter.

6. The combination of claim 1 wherein said urging means comprises a pair of annular spring means extending about said sleeve means and engaged with the opposite end portions of said inserts projecting outwardly of said slots and yieldingly urging the remote end portions of each of said inserts radially inwardly of said sleeve means.

References Cited by the Examiner

UNITED STATES PATENTS

| 2,236,047 | 3/41 | Wattleworth | 29—51 XR |
| 2,574,157 | 11/51 | Reichert | 279—66 |

FOREIGN PATENTS 525,605  5/31  Germany.

ANDREW R. JUHASZ, *Primary Examiner.*

WILLIAM W. DYER, JR., *Examiner.*